Dec. 15, 1931.  J. P. CROWLEY  1,836,362
GLASS BUCK
Filed April 27, 1925   2 Sheets-Sheet 1
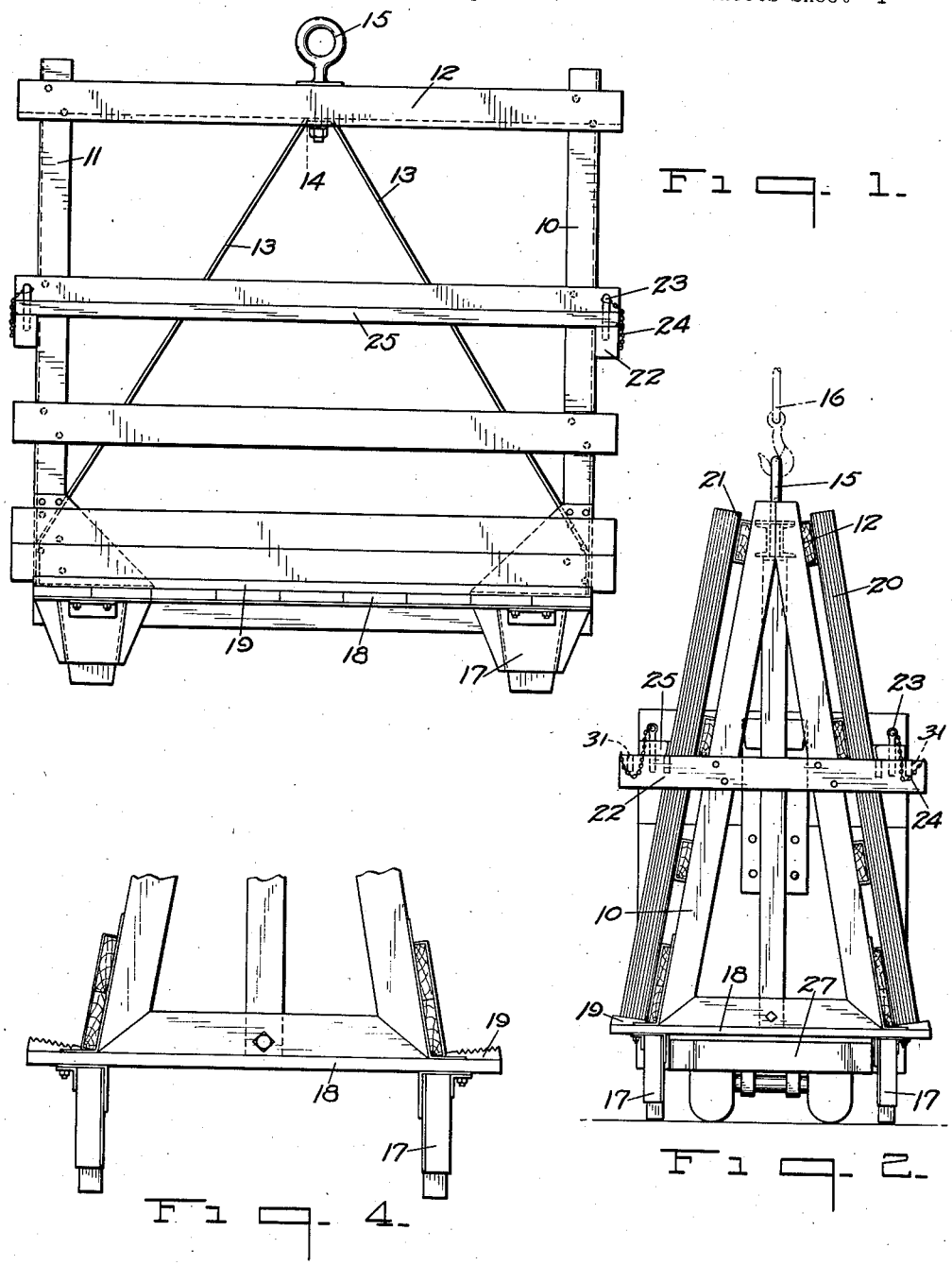
INVENTOR.
Joseph P. Crowley
Frank Fraser
ATTORNEY.

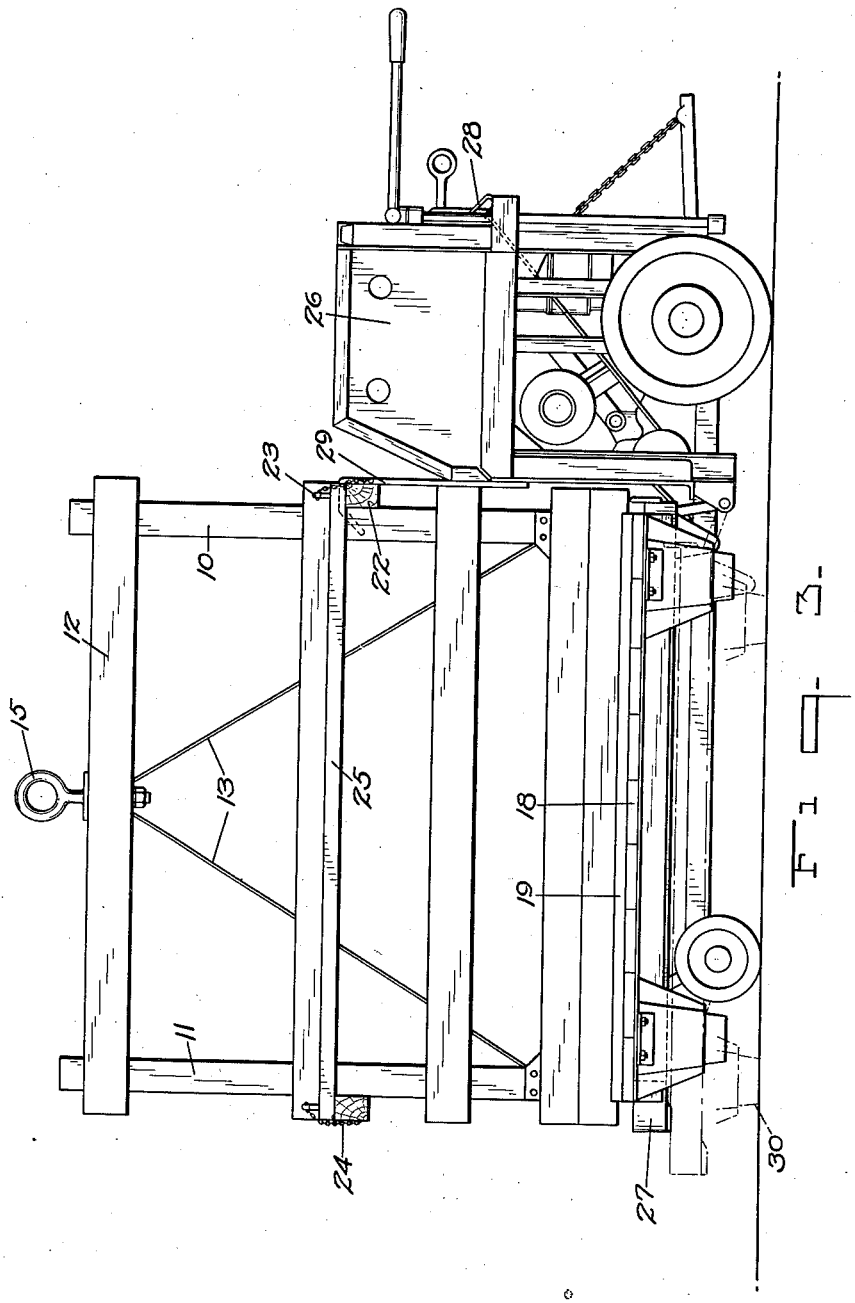

Patented Dec. 15, 1931

1,836,362

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

GLASS BUCK

Application filed April 27, 1925. Serial No. 25,975.

The present invention relates to a glass handling apparatus, and has reference to means for easily handling relatively large sheets of glass.

An important object of the invention is to provide a device capable of supporting and conveying a plurality of sheets of glass.

Another object of the invention is to provide a glass buck capable of supporting a plurality of sheets of glass in a rigid manner so that the buck can be picked up and transferred from place to place without injury to the glass being supported.

Other objects and advantages of the invention will become apparent during the course of the following description.

In the drawings wherein like numerals are employed to designate like parts throughout the same, Fig. 1 is a front view of the buck, Fig. 2 is an end view thereof showing a plurality of sheets of glass being supported, Fig. 3 is a front view of the buck showing how it is adapted for transfer, and Fig. 4 is a fragmentary elevation of a slightly modified form of construction.

The glass buck herein disclosed is particularly well-adapted for use in a plate glass factory where it is desired to transfer a quantity of sheets of glass from one machine to another, etc. As plate glass is the highest type of glass manufactured and is therefore expensive, it is necessary to handle the glass with exceptional care. This is difficult as most plate glass is relatively large and it is a difficult matter to shift the glass from place to place with any speed, especially when it is desired to move more than one sheet.

With the glass buck shown in the drawings it is possible to move a great number of sheets of glass at one time without possible injury thereto. The glass buck comprises a pair of end pieces 10 and 11 connected together by means of the cross members 12 and truss bars 13. The truss bars 13 are preferably metallic and are connected to the bottoms of the end pieces 10 as shown in Fig. 1. When made of metal both of these members may be of an integral structure and bent at the top 14 to permit an eye bolt or member 15 to be connected thereto. A hook 16 carried by a crane can be engaged by the eye bolt whereby the buck can be lifted bodily and moved from place to place. Feet 17 are provided at each corner so that the buck can be placed upon the ground as shown in Fig. 4. Arranged along the floor 18 of the buck is a pair of foot or supporting members 19 which are wedge-shaped as shown in Fig. 2 or serrated as shown in Fig. 4, and are adapted to support the lower edges of the sheets of glass 20. The members 12 are provided with a protective covering such as felt 21 to prevent scratching of the sheets.

Arranged approximately midway of the end pieces 10 are cross arms 22 provided with a plurality of apertures 31 adapted to receive pins 23 preferably carried by the chains 24. Guards 25 provided along its inner edges with a protective medium may be run from end to end and held in position by means of the pins 23 to prevent displacement of the sheets of glass while the buck is being moved. The plurality of openings or apertures 31 are provided at each end of each cross arm 22 in order that the guards 25 may be moved toward or away from the frame and locked in varying positions according to the number of sheets being carried upon the frame. Instead of the crane having means engaging the eye bolt 15 to move the buck and glass around, a movable truck 26 which is preferably electric, can be used. The truck 26 is provided with a platform 27 which may be elevated by means of the roll 28. A hooked arm 29 is carried on the front part of the truck and is adapted to engage one of the cross arms 22. If it is desired to move the buck, the truck 26 is run under the floor 18 and between the end legs 17. Of course this is done when the platform 27 of the truck is in a lowered position as indicated by the dotted lines 30 in Fig. 3. When the truck is in position the rod 28 is operated and the platform 27 will become elevated, thus lifting the buck clear of the floor permitting the truck to be run. The arm 29 will prevent displacement of the buck while the truck 26 is in motion.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass buck of the character described, comprising a frame for supporting sheets of glass and including end members, members arranged transversely of said buck and extending past the end members, and means arranged longitudinally of the buck and engageable with said transverse members for preventing accidental displacement of the sheets of glass being supported.

2. A glass buck of the character described, comprising a frame for supporting sheets of glass and including end members, members carried by and arranged transversely of said end members and projecting beyond the same, members arranged longitudinally of the buck and engageable with said transverse members for preventing accidental displacement of the sheets of glass being supported, and means for adjustably securing said last named members to the projecting portions of said transverse members so that they are movable toward and away from the frame to lock a varying number of glass sheets in place.

3. A glass buck of the character described, comprising a frame for supporting sheets of glass and including end members, means carried by the end members and projecting therebeyond, and means arranged longitudinally of said frame and engageable with said first mentioned means for preventing accidental displacement of the sheets of glass being supported.

4. A glass buck of the character described, comprising a frame for supporting sheets of glass and including end members, means carried by the end members and projecting therebeyond, means arranged longitudinally of the frame and engageable with said first mentioned means for preventing accidental displacement of the sheets of glass being supported, and means for adjustably securing said second mentioned means to the projecting portions of said first mentioned means so that said second mentioned means is movable toward and away from the frame to lock a varying number of glass sheets in place.

5. A glass buck of the character described, comprising a frame for supporting sheets of glass and including end members, stationary members carried by said end members and projecting therebeyond at one side thereof, and a movable member arranged longitudinally of said frame and engageable with said stationary members for preventing accidental displacement of the sheets of glass being supported.

6. A glass buck of the character described, comprising a frame for supporting sheets of glass and including end members, stationary members carried by said end members and projecting therebeyond at one side thereof, a movable member arranged longitudinally of said frame and engageable with said stationary members for preventing accidental displacement of the sheets of glass being supported, and means for adjustably securing said movable member to the projecting portions of said stationary members so that said movable member is movable toward and away from the frame to lock a varying number of glass sheets in place.

Signed at Toledo, in the county of Lucas, and State of Ohio, this 24th day of April, 1925.

JOSEPH P. CROWLEY.